(12) United States Patent
Etoh et al.

(10) Patent No.: US 8,941,948 B2
(45) Date of Patent: Jan. 27, 2015

(54) PERPENDICULAR RECORDING HEAD WITH LEADING BUMP IN THE MAIN POLE HAVING NARROW LEADING GAP (LG)

(75) Inventors: Kimitoshi Etoh, Odawara (JP); Mikito Sugiyama, Odawara (JP); Hisashi Kimura, Odawara (JP); Kazuhiko Hosomi, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 30 days.

(21) Appl. No.: 13/526,418

(22) Filed: Jun. 18, 2012

(65) Prior Publication Data

US 2013/0335854 A1 Dec. 19, 2013

(51) Int. Cl.
*G11B 5/23* (2006.01)
*G11B 5/31* (2006.01)
*G11B 5/11* (2006.01)

(52) U.S. Cl.
USPC ............. 360/119.04; 360/119.03; 360/125.11

(58) Field of Classification Search
CPC ..... G11B 5/1278; G11B 5/3116; G11B 5/315
USPC ............. 360/119.02, 119.03, 119.04, 125.11, 360/125.15
See application file for complete search history.

(56) References Cited

U.S. PATENT DOCUMENTS

| | | | |
|---|---|---|---|
| 5,075,956 A * | 12/1991 | Das ........................ | 360/125.15 |
| 6,134,080 A * | 10/2000 | Chang et al. ............ | 360/125.64 |
| 6,330,127 B1 * | 12/2001 | Sasaki ..................... | 360/125.65 |
| 7,159,302 B2 | 1/2007 | Feldbaum et al. | |
| 7,251,878 B2 | 8/2007 | Le et al. | |
| 7,796,359 B2 | 9/2010 | Otani et al. | |
| 7,889,456 B2 | 2/2011 | Jiang et al. | |
| 7,920,358 B2 | 4/2011 | Jiang et al. | |
| 8,277,669 B1 * | 10/2012 | Chen et al. ............... | 360/125.3 |
| 8,320,076 B1 * | 11/2012 | Shen et al. ............... | 360/125.04 |
| 8,375,564 B1 * | 2/2013 | Luo et al. ................. | 360/122 |
| 8,427,781 B1 * | 4/2013 | Sasaki et al. ............. | 360/125.15 |
| 2002/0018317 A1 * | 2/2002 | Sato et al. ................ | 360/126 |
| 2005/0141137 A1 * | 6/2005 | Okada et al. ............. | 360/119 |
| 2006/0098340 A1 * | 5/2006 | Kameda ................... | 360/126 |
| 2008/0112081 A1 | 5/2008 | Matono | |
| 2008/0239567 A1 * | 10/2008 | Sasaki et al. ............. | 360/111 |
| 2008/0266710 A1 | 10/2008 | Kameda et al. | |
| 2009/0154019 A1 * | 6/2009 | Hsiao et al. .............. | 360/234.3 |
| 2009/0268348 A1 * | 10/2009 | Bonhote et al. .......... | 360/313 |
| 2010/0112486 A1 | 5/2010 | Zhang et al. | |
| 2010/0157484 A1 | 6/2010 | Etoh et al. | |
| 2010/0165517 A1 | 7/2010 | Araki et al. | |
| 2010/0277832 A1 * | 11/2010 | Bai et al. ................. | 360/125.03 |
| 2011/0075299 A1 | 3/2011 | Olson et al. | |
| 2011/0151279 A1 | 6/2011 | Allen et al. | |
| 2013/0155550 A1 * | 6/2013 | Sasaki et al. ............. | 360/122 |

FOREIGN PATENT DOCUMENTS

| | | |
|---|---|---|
| JP | 2003-242607 | 8/2003 |
| JP | 2008/243350 | 10/2008 |

(Continued)

*Primary Examiner* — Craig A. Renner
(74) *Attorney, Agent, or Firm* — Zilka-Kotab, PC

(57) ABSTRACT

In one embodiment, a perpendicular magnetic recording head includes a main magnetic pole; a leading shield below a leading side of the main magnetic pole; a leading gap between the leading shield and the main magnetic pole; a trailing shield above a trailing side of the main magnetic pole; a trailing gap between the trailing shield and the main magnetic pole; and a nonmagnetic leading bump between the main magnetic pole and the leading shield. Additional embodiments are also disclosed.

21 Claims, 16 Drawing Sheets

(56) References Cited

FOREIGN PATENT DOCUMENTS

| | | |
|---|---|---|
| JP | 2009/004068 | 1/2009 |
| JP | 2010/061715 A | 3/2010 |
| JP | 2010/061735 A | 3/2010 |
| WO | 2009/147729 A1 | 12/2009 |

* cited by examiner

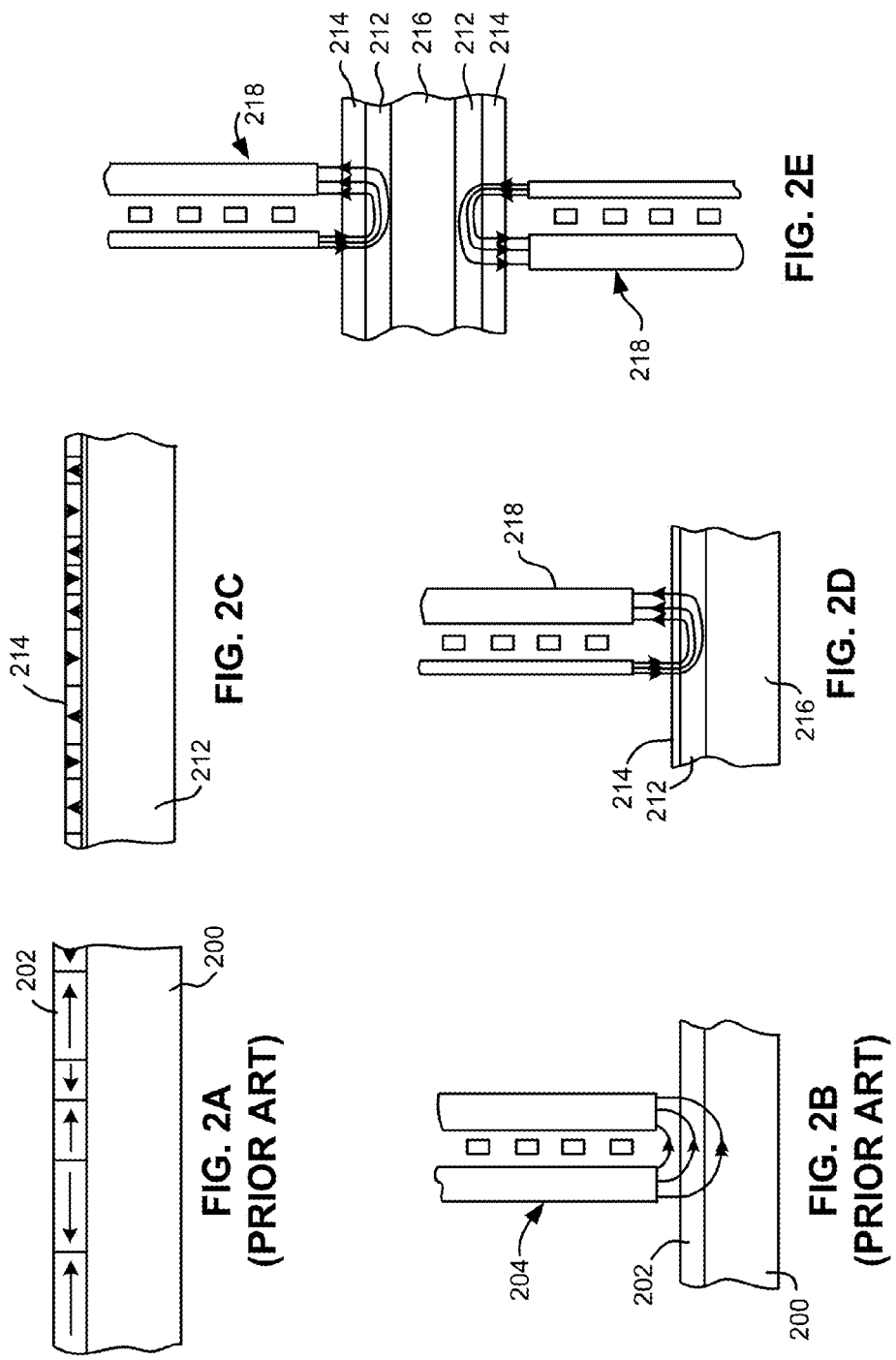

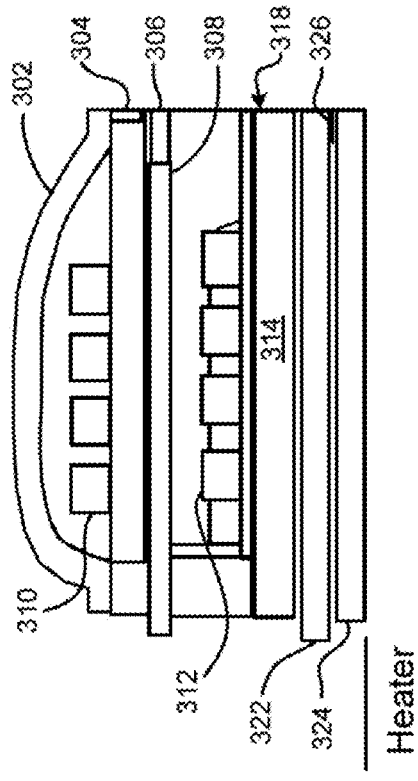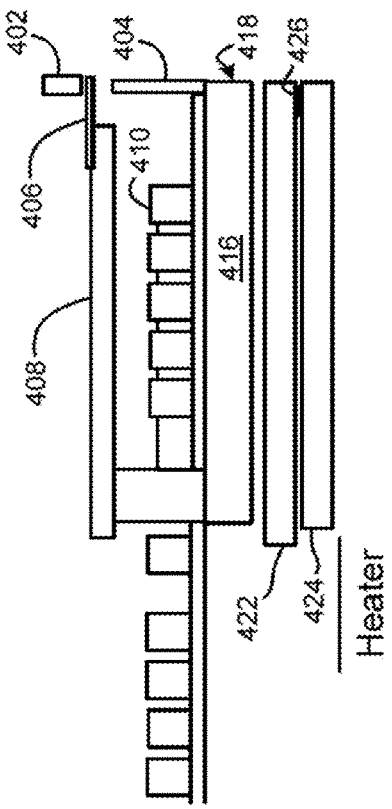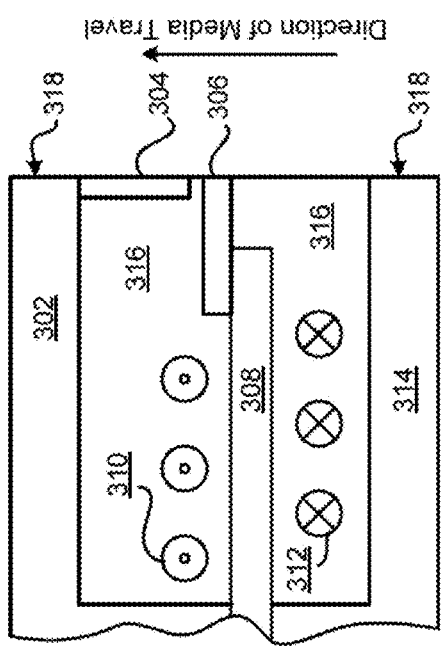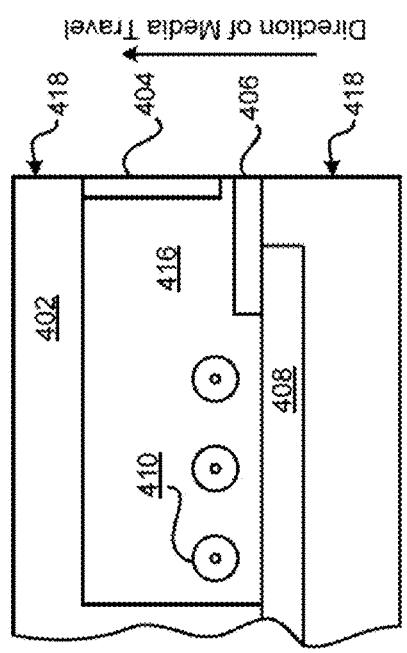

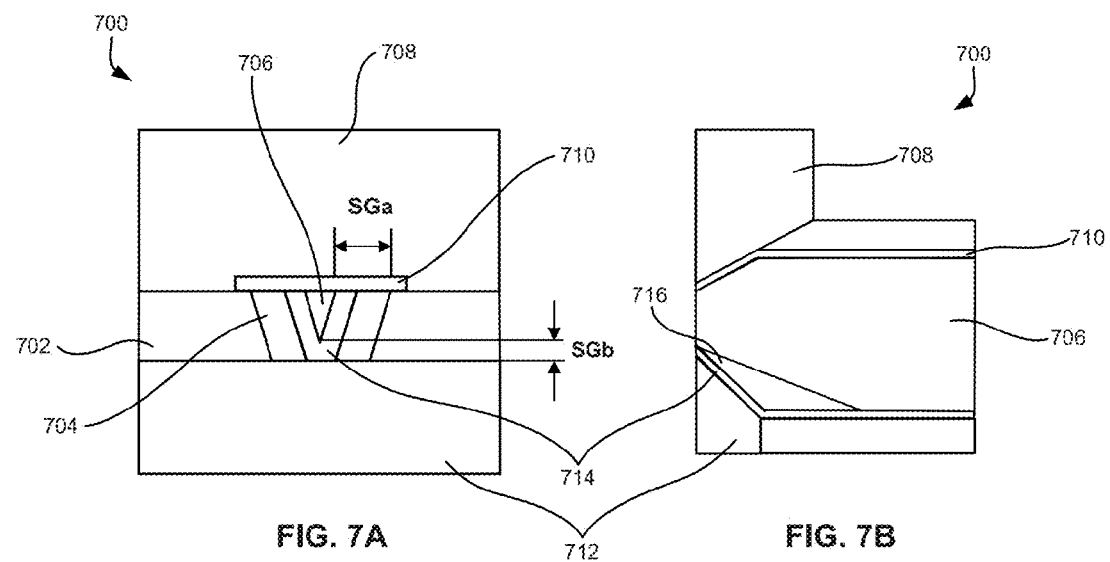

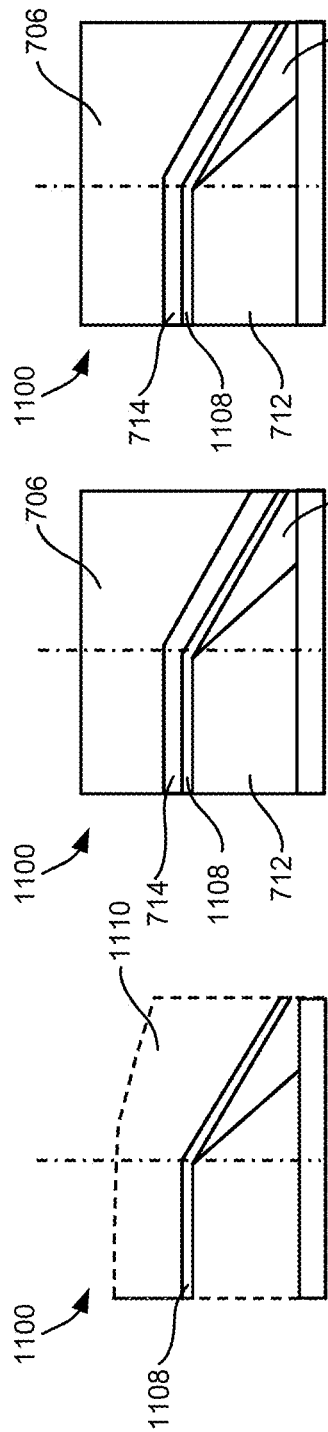

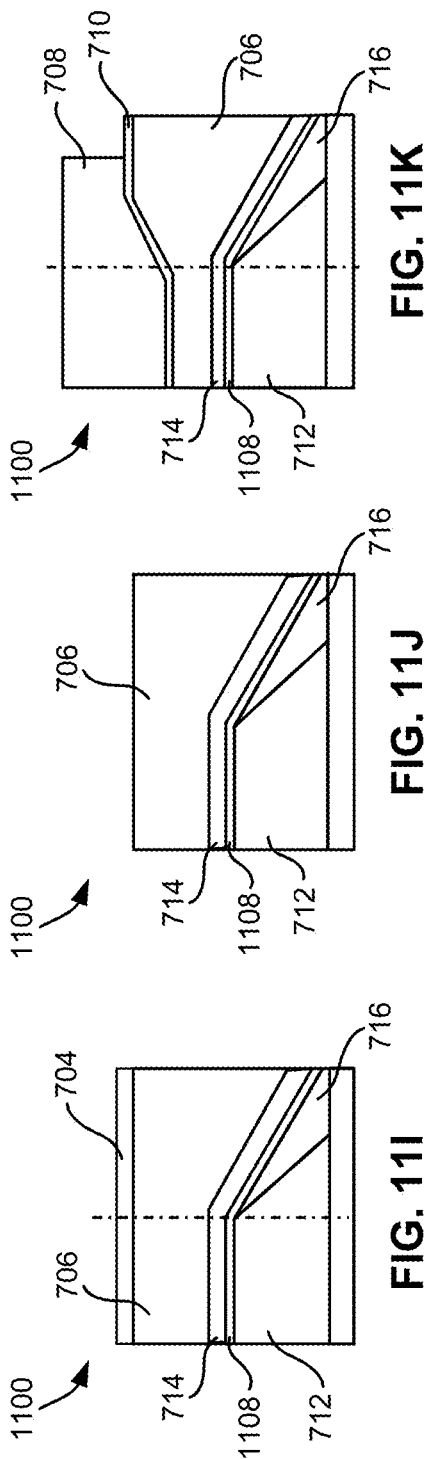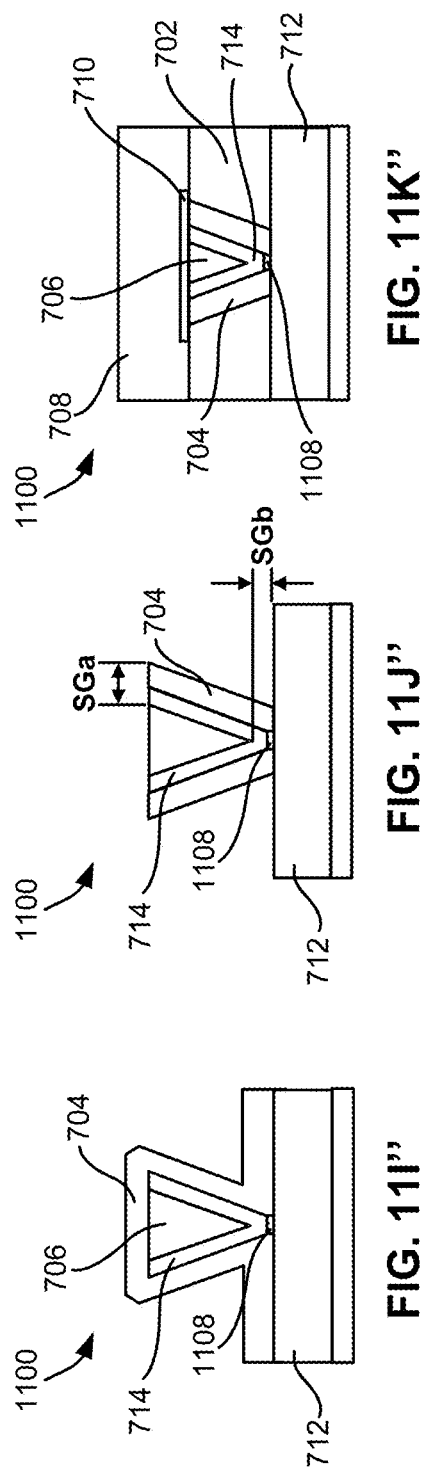

PERPENDICULAR RECORDING HEAD WITH LEADING BUMP IN THE MAIN POLE HAVING NARROW LEADING GAP (LG)

FIELD OF THE INVENTION

The present invention relates to data storage systems, and more particularly, this invention relates to a magnetic recording head for increasing the recording density of a hard disk drive.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Demand has grown rapidly for storing images, music, and the like in hard disk drives, in the cases of video recorders with hard disk drives attached thereto, TVs with hard disk drives mounted therein, and so forth.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components. The further miniaturization of the various components, however, presents its own set of challenges and obstacles.

The width of a recording track may be reduced in order to substantially increase the surface area recording density, however, reducing the recording track width causes the magnetic field generated on a recording medium from a lead end of a main magnetic pole to be reduced.

In a magnetic disk apparatus, reading is performed on a wide area from an inner circumference to an outer circumference in a magnetic recording medium. In the inner circumference and the outer circumference of the magnetic recording medium, however, the magnetic head performs the reading with a skew angle of about 0-20° with respect to a tangent line to the rotational direction of the magnetic recording medium. If the shape of the media facing surface in the main magnetic pole is rectangular, then a problem occurs in that the adjacent tracks tend to be removed.

In order to prevent this problem, conventional products use a main magnetic pole of a so-called reversed trapezoid shape in which the width of the leading side of the main magnetic pole is formed narrower than that of a trailing side of the main magnetic pole so as to correspond to the narrower track width. Further, in order to improve the density of the surface area for recording, it is required that the track widths be reduced narrowly while a track part of the main magnetic pole defining the recording track width is kept at the reversed trapezoidal shape corresponding to the skew angle.

In order to improve the density of the surface area for recording, it is essential to reduce the track width. However solutions for the resulting problem of a reduction in the recording magnetic field have been elusive.

Therefore, it would be desirable to provide a magnetic recording head structure, and manufacturing method thereof, in which overwriting of adjacent tracks is prevented while retaining a high magnetic field intensity and good magnetic field inclination with a high density of surface area recording.

SUMMARY

In one general embodiment, a perpendicular magnetic recording head includes a main magnetic pole; a leading shield below a leading side of the main magnetic pole; a leading gap between the leading shield and the main magnetic pole; a trailing shield above a trailing side of the main magnetic pole; a trailing gap between the trailing shield and the main magnetic pole; and a nonmagnetic leading bump between the main magnetic pole and the leading shield.

In another general embodiment, a perpendicular magnetic recording head includes a main magnetic pole; a leading shield below a leading side of the main magnetic pole; a nonmagnetic leading gap between the leading shield and the main magnetic pole; a trailing shield above a trailing side of the main magnetic pole; a nonmagnetic trailing gap between the trailing shield and the main magnetic pole; and a nonmagnetic leading bump between the main magnetic pole and the leading shield, wherein a portion of the leading side of the main magnetic pole tapers towards the trailing side of the main magnetic pole therealong towards a media facing surface thereof; wherein the leading bump has a first portion extending along the portion of the leading side, a thickness of the first portion increasing therealong in a direction away from a media facing surface.

In yet another general embodiment, a perpendicular magnetic recording head includes a main magnetic pole; a leading shield below a leading side of the main magnetic pole; a nonmagnetic leading gap between the leading shield and the main magnetic pole; a trailing shield above a trailing side of the main magnetic pole; a nonmagnetic trailing gap between the trailing shield and the main magnetic pole; and a nonmagnetic leading bump between the main magnetic pole and the leading shield, wherein portions of the leading and trailing sides of the main magnetic pole taper towards one another therealong in a direction towards a media facing surface, wherein the leading bump extends along the tapered portion of the leading edge of the main magnetic pole, wherein the leading bump has a first portion, a thickness of the first portion increasing therealong in a direction away from a media facing surface, wherein the leading bump has a second portion extending from the first portion in a direction away from the media facing surface, a thickness of the second portion decreasing therealong in a direction away from the media facing surface, wherein the leading bump has a triangular cross sectional shape along a plane dissecting the main magnetic pole in an in-track direction.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 7A is a partial view of a magnetic recording head according to one embodiment.

FIG. 7B is a partial view of a magnetic recording head according to one embodiment.

FIG. 11F is a partial cross-sectional view of a magnetic recording head according to one embodiment.

FIG. 11F" is a partial view of that depicted in FIG. 11F.

FIG. 11G is a partial cross-sectional view of a magnetic recording head according to one embodiment.

FIG. 11G" is a partial view of that depicted in FIG. 11G.

FIG. 11H is a partial cross-sectional view of a magnetic recording head according to one embodiment.

FIG. 11H" is a partial view of that depicted in FIG. 11H.

FIG. 11I is a partial cross-sectional view of a magnetic recording head according to one embodiment.

FIG. 11I" is a partial view of that depicted in FIG. 11I.

FIG. 11J is a partial cross-sectional view of a magnetic recording head according to one embodiment.

FIG. 11J" is a partial view of that depicted in FIG. 11J.

FIG. 11K is a partial cross-sectional view of a magnetic recording head according to one embodiment.

FIG. 11K" is a partial view of that depicted in FIG. 11K.

DETAILED DESCRIPTION

Figure 1:
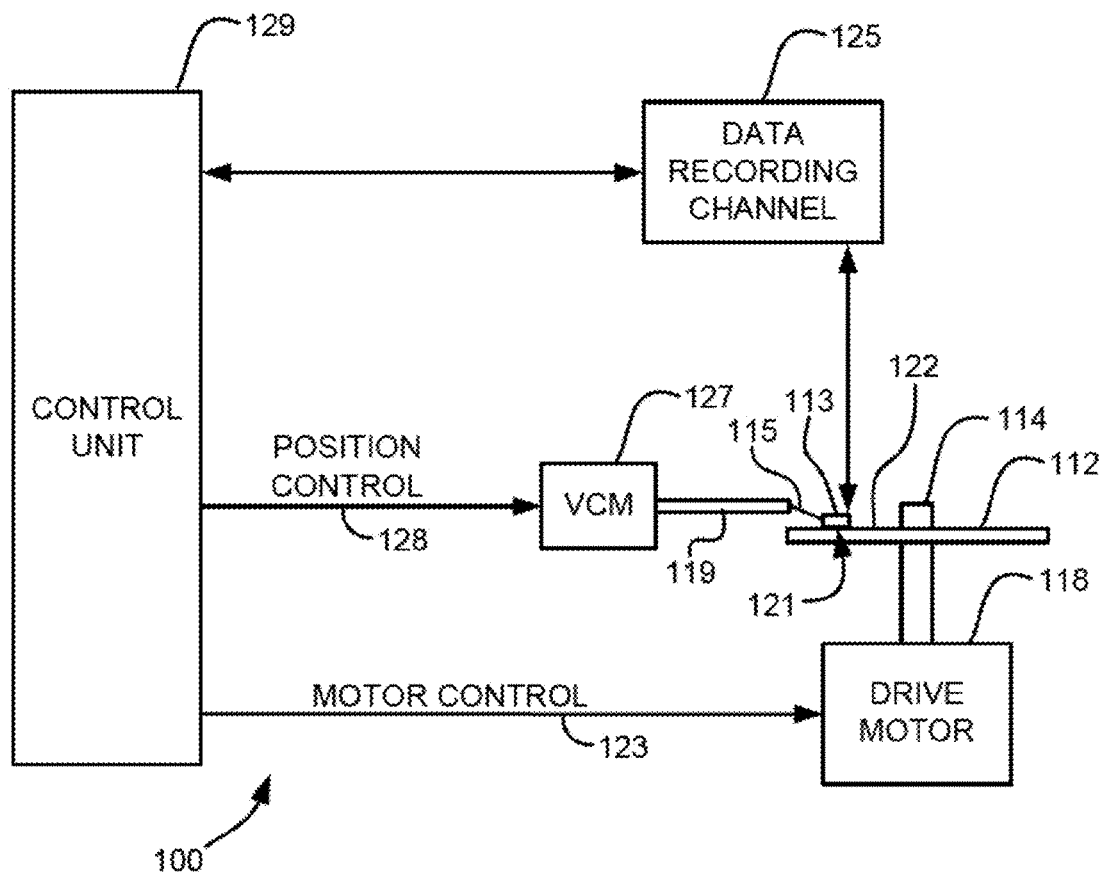
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a perpendicular magnetic recording head includes a main magnetic pole; a leading shield below a leading side of the main magnetic pole; a leading gap between the leading shield and the main magnetic pole; a trailing shield above a trailing side of the main magnetic pole; a trailing gap between the trailing shield and the main magnetic pole; and a nonmagnetic leading bump between the main magnetic pole and the leading shield.

In another general embodiment, a perpendicular magnetic recording head includes a main magnetic pole; a leading shield below a leading side of the main magnetic pole; a nonmagnetic leading gap between the leading shield and the main magnetic pole; a trailing shield above a trailing side of the main magnetic pole; a nonmagnetic trailing gap between the trailing shield and the main magnetic pole; and a nonmagnetic leading bump between the main magnetic pole and the leading shield, wherein a portion of the leading side of the main magnetic pole tapers towards the trailing side of the main magnetic pole therealong towards a media facing surface thereof; wherein the leading bump has a first portion extending along the portion of the leading side, a thickness of the first portion increasing therealong in a direction away from a media facing surface.

In yet another general embodiment, a perpendicular magnetic recording head includes a main magnetic pole; a leading shield below a leading side of the main magnetic pole; a nonmagnetic leading gap between the leading shield and the main magnetic pole; a trailing shield above a trailing side of the main magnetic pole; a nomnagnetic trailing gap between the trailing shield and the main magnetic pole; and a nomnagnetic leading bump between the main magnetic pole and the leading shield, wherein portions of the leading and trailing sides of the main magnetic pole taper towards one another therealong in a direction towards a media facing surface; wherein the leading bump extends along the tapered portion of the leading edge of the main magnetic pole, wherein the leading bump has a first portion, a thickness of the first portion increasing therealong in a direction away from a media facing surface, wherein the leading bump has a second portion extending from the first portion in a direction away from the media facing surface, a thickness of the second portion decreasing therealong in a direction away from the media facing surface, wherein the leading bump has a triangular cross sectional shape along a plane dissecting the main magnetic pole in an in-track direction.

Referring now to FIG. 1, there is shown a disk drive 100 in accordance with one embodiment. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Conventional magnetic recording methods include increasing the size of the main magnetic pole's air bearing surface. Moreover, conventional methods also improve the intensity of the magnetic field while correspondence with the skew angle is kept. Still other conventional methods concentrate the intensity of the magnetic field on the leading end of the media facing surface of the main magnetic pole.

In still other conventional approaches, to improve the recording density, a perpendicular recording head has been used in which a taper shape is formed in the leading and trailing sides to improve the magnetic field intensity, while the shape of the track part in the main magnetic pole is kept in the reversed trapezoidal shape corresponding to the skew angle.

However, such conventional approaches have a problem in that the removal of adjacent tracks (Adjacent Track Interface (ATI)) still occurs. In order to prevent the removal of adjacent tracks, a shield of the leading side may be located closer to the main magnetic pole to prevent leakage of the magnetic field from the main pole. However, as a trade-off, there is the problem that the intensity of the magnetic field tends to decrease.

Hereinafter, preferred embodiments will be described in more detail with reference to the accompanying drawings. In the drawings described herein, the same reference numerals may be assigned to the same functional parts, respectively.

Figures 5A, 5B:
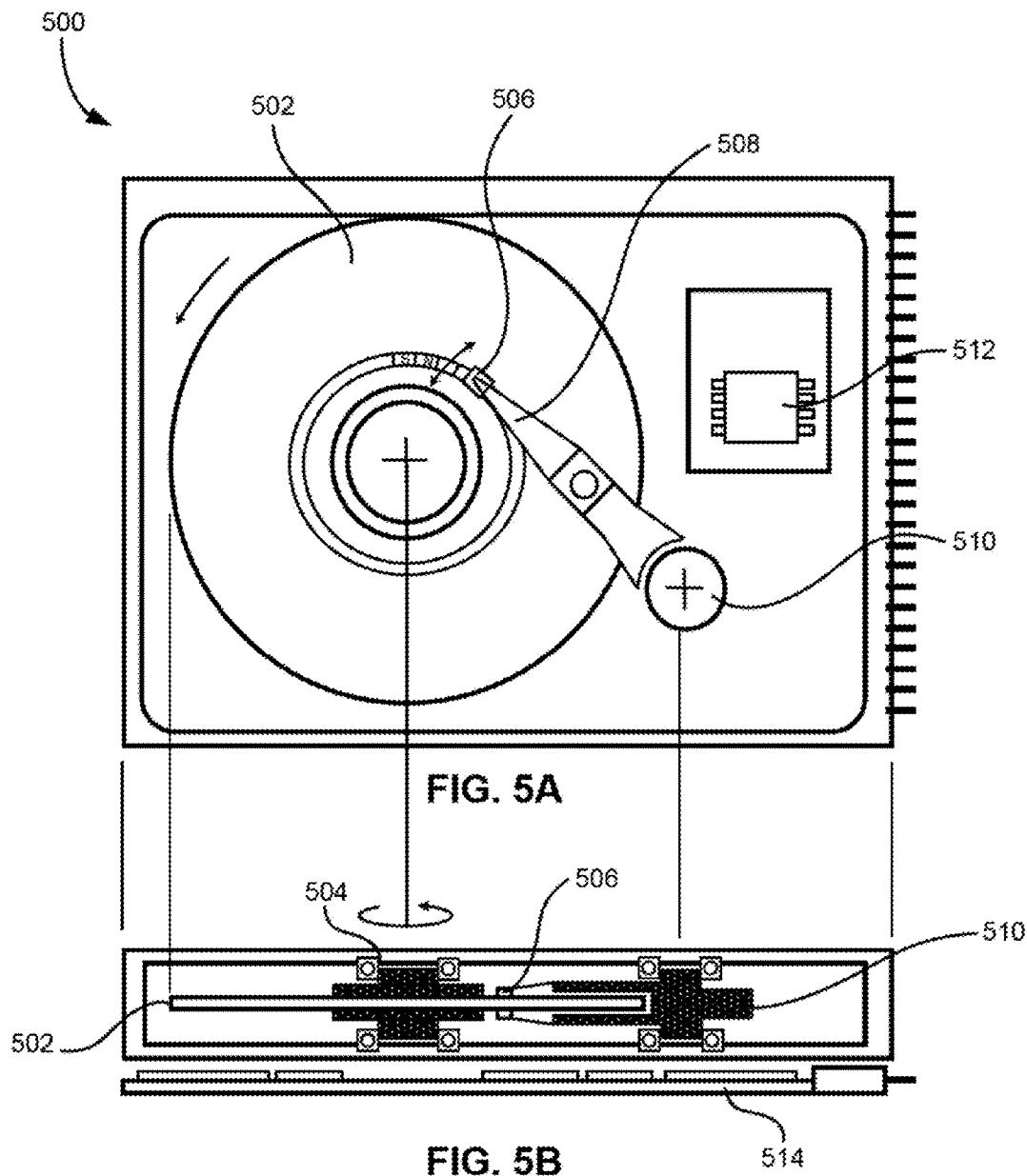
FIG. 5A is a top down view of a magnetic recording system according to one embodiment.
FIG. 5B is a cross-sectional view of the magnetic recording system of FIG. 5A.

FIGS. 5A-5B depict a magnetic recording system 500, in accordance with one embodiment. As an option, the present magnetic recording system 500 may be implemented in conjunction with features from any other embodiment listed herein, such as those described with reference to the other FIGS. Of course, however, such magnetic recording system 500 and others presented herein may be used in various applications and/or in permutations which may or may not be specifically described in the illustrative embodiments listed herein. Further, the magnetic recording system 500 presented herein may be used in any desired environment.

FIGS. 5A-5B are top down and cross-sectional conceptual views respectfully, of a magnetic recording system 500. The magnetic recording system 500 may record and reproduce signals (e.g., magnetic signals, etc.) on a predetermined area of a magnetic medium 502. According to various approaches, the magnetic medium may include a magnetic disk, magnetic tape, etc. or any other magnetic medium which would be apparent to one skilled in the art upon reading the present description.

As shown in FIGS. 5A-5B, the magnetic medium 502 is rotated by a motor 504. A magnetic head which may be mounted on a slider 506. Moreover, the slider 506 may be secured to a lead end of a suspension arm 508. Preferably, it may be possible to select a position of the magnetic head in a radial direction of the magnetic disk (track) by driving a rotary actuator 510.

With continued reference to FIGS. 5A-5B, recording (or writing) signals to, and reading signals from, the magnetic head may be processed in signal processing circuits 512, 514.

Figure 6:
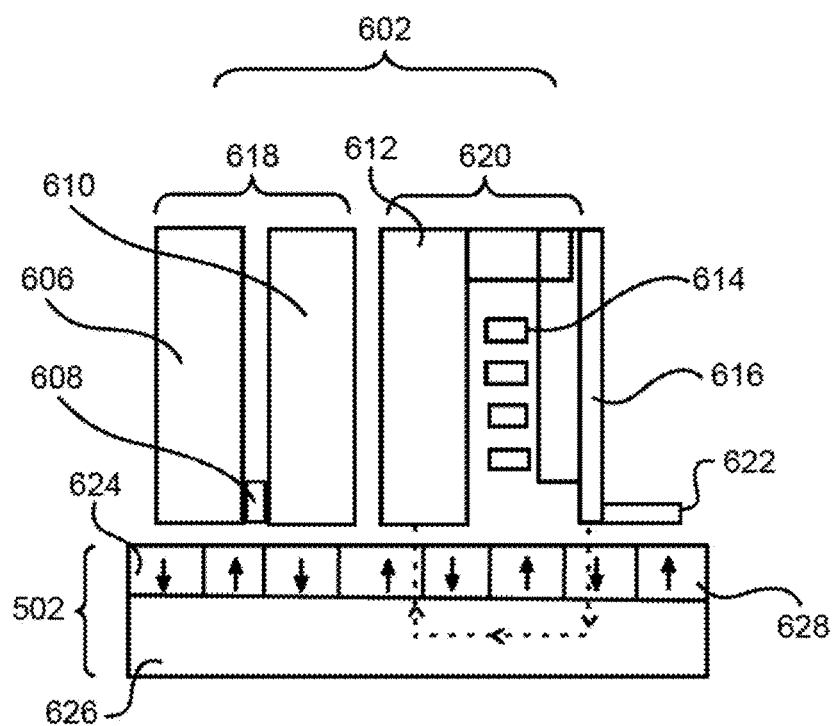
FIG. 6 is a partial view of a magnetic recording head according to one embodiment.

Referring now to FIG. 6, an embodiment is shown, schematically illustrating a relationship between a perpendicular magnetic head 602 and a magnetic disk 502, and perpendicular recording. According to various approaches, the perpendicular magnetic head 602 may include one, some or all of: a lower reproducing shield 606, a reproducing element 608, an upper reproducing shield 610, an assistant magnetic pole 612, a thin film coil 614 and a main magnetic pole 616; which may be stacked in the same or a different sequence as listed, from a running direction side of the head (leading side).

The lower reproducing shield 606, the reproducing element 608 and the upper reproducing shield 610 may constitute a reproducing head 618. Moreover, the assistant magnetic pole 612, a thin film coil 614 and a main magnetic pole 616 may constitute a recording head (a single pole head) 620. According to various approaches, the reproducing element 608 of the reproducing head may include, GMR (Giant Magneto Resistive effect element), TMR (Tunnel Magneto Resistive effect element), etc.

In another approach, the main magnetic pole 616 may include a track part defining a width of the recording track, and a player part integrally formed with the track part which may gradually increase in width along the height direction of the element. Moreover, a trailing shield 622 may be formed on a trailing side and both sides of a track width direction of the main magnetic pole 616.

In one approach, the track part of the main magnetic pole 616 may have the shape of a reversed trapezoid at a media facing surface thereof, in consideration of the skew angle of the head. Preferably, the reversed trapezoid of the track part may have a narrower width at the leading side thereof.

The magnetic field generated from the main magnetic pole 616 of the recording head 620 passes through a magnetic recording layer 624 of the magnetic disk 502. Furthermore, a soft magnetic backing layer 626 may ultimately direct magnetic flux back into the assistant magnetic pole 612 to form a magnetic circuit, thereby enabling the head to record a magnetizing pattern 628 on the magnetic recording layer 624. The portion of the main pole 616 farthest from a point on the magnetic disk, i.e., the shapes of the top side (trailing side) and lateral sides of the track part in the main pole 616 may greatly influence the shape of the magnetized pattern. There may be also an interlayer formed between the recording layer 624 of the magnetic disk 502 and the soft magnetic backing layer 626.

FIGS. 7A-7B depict a perpendicular magnetic recording head 700, in accordance with one embodiment. As an option, the present perpendicular magnetic recording head 700 may be implemented in conjunction with features from any other embodiment listed herein, such as those described with reference to the other FIGS. Of course, however, such perpendicular magnetic recording head 700 and others presented herein may be used in various applications and/or in permutations which may or may not be specifically described in the illustrative embodiments listed herein. Further, the perpendicular magnetic recording head 700 presented herein may be used in any desired environment.

FIGS. 7A-7B illustrate the shape of the media facing surface, and a sectional view respectively, taken in the height direction of the perpendicular magnetic record ng head according to an illustrative embodiment.

In one approach, the perpendicular magnetic recording head may include a main magnetic pole. In a further approach, portions of the leading and trailing sides of the main magnetic pole may taper towards one another respectfully, therealong in a direction towards a media facing surface, e.g., the sides taper together as they approach the media facing surface. In another approach, a portion of the leading side of the main magnetic pole may taper towards the trailing side of the main magnetic pole therealong towards a media facing surface thereof. In another approach, a portion of the trailing side of the main magnetic pole may taper towards the leading side of the main magnetic pole therealong towards a media facing surface.

As illustrated in FIGS. 7A-7B, a side shield 702 may be formed near a side gap 704. In a preferred approach, the side shield may be on a cross track side of the main magnetic pole. Furthermore, the side gap may be between the main magnetic pole and the side shield.

Moreover, in the down-track direction, a trailing shield 708 may be formed near a trailing gap 710. The trailing shield may be above a trailing side of the main magnetic pole. In yet another approach, the trailing gap may be positioned between the trailing shield and the main magnetic pole.

Furthermore, on the leading side, a leading shield 712 may be formed near a leading gap 714. In one approach, the leading shield may be below a leading side of the main magnetic pole. Moreover, the leading gap may be positioned between the leading shield and the main magnetic pole.

According to one approach, the leading gap and/or the trailing gap and/or the side gap may preferably incorporate a nonmagnetic gap. Moreover, in another approach, any of the aforementioned shields may be magnetically connected, respectively.

In one approach, a media facing surface of the leading gap 714, trailing gap, side gaps, and/or trailing bump may incorporate a material such as an oxide, and preferably a nonmagnetic material. According to various approaches, the oxide may include alumina, $SiO_2$, etc.; and according to further approaches, the nonmagnetic material may include Ru, NiCr, etc.

With continued reference to FIGS. 7A-7B, in one approach, the side gap may be characterized in that the relationship between the leading gap 714 thickness (SGb) below the pole 706 and the total width (SGa) of the gap formed by the side gap 704 and the leading gap 714 in the cross-track direction on one side of the pole 706 may be about SGb≤SGa in length, but could be longer or shorter depending on the desired embodiment. In a preferred approach, the width of the leading gap 714 may be decreased to be nearly equal to that of the leading shield 712, so that the magnetic bubble from the main magnetic pole 706 can be reduced to effectively improve writing ability.

Referring now to FIG. 7B, according to one approach, nonmagnetic material may be formed between the main magnetic pole 706 and a taper face of a leading shield 712. Hereinafter, the nonmagnetic material is referred to as a nonmagnetic leading bump 716. In a preferred approach, the nonmagnetic leading bump may be between the main magnetic pole and the leading shield. In another approach, the leading bump may be recessed from a media-facing surface.

According to one approach, the nonmagnetic leading bump 716 may have a shape such that the film thickness of the nonmagnetic leading bump is relatively thinner near the media facing surface so as to reduce the interval between the main magnetic pole 706 and the leading shield 712. Moreover, in a preferred approach, the nomnagnetic leading bump and the main magnetic pole may become gradually wider as each goes away along the height of the element from the media facing surface. Further, it is also a preferred characteristic in aspect of shape according to this embodiment that the thickness of thin film in the nomnagnetic leading bump 716 is decreased gradually as it goes away from a rearward end of the taper face of the leading shield 712.

In one approach, the leading bump may have a first portion. A thickness of the first portion, as measured along a line extending in the in-track direction, may increase therealong in a direction away from a media facing surface.

Furthermore, the leading bump may have a second portion. In one approach, the second portion may extend from the first portion in a direction away from the media facing surface. Moreover, the second portion may additionally extend from the first portion along the tapered portion of the main magnetic pole.

In a further approach, a thickness of the second portion may decrease therealong in a direction away from the media facing surface, e.g., as seen in FIG. 7B.

In yet another approach, the leading bump may have a triangular cross sectional shape along a plane dissecting the main magnetic pole in an in-track direction. See FIG. 7B.

In one approach, the leading bump may extend along the tapered portion of the leading edge of the main magnetic pole. In another approach, the leading bump may have a first portion extending along the portion of the leading side. In one approach, the thickness of the first portion, as preferably measured along a line extending in the in-track direction, may increase therealong in a direction away from a media facing surface.

Should the main magnetic pole of the media facing surface side and the leading shield 712 become narrower in width thereof, there may be a concern about reduction of a magnetic field for write-recording because a magnetic field flows in the shield side. It is, however, possible to greatly reduce a loss of magnetic field intensity caused due to a leakage of the magnetic field in the tapered part of the leading shield 712 because the interval between the main magnetic pole 706 and the leading shield 712 is increased by forming the nonmagnetic leading bump 716.

Figure 8A:
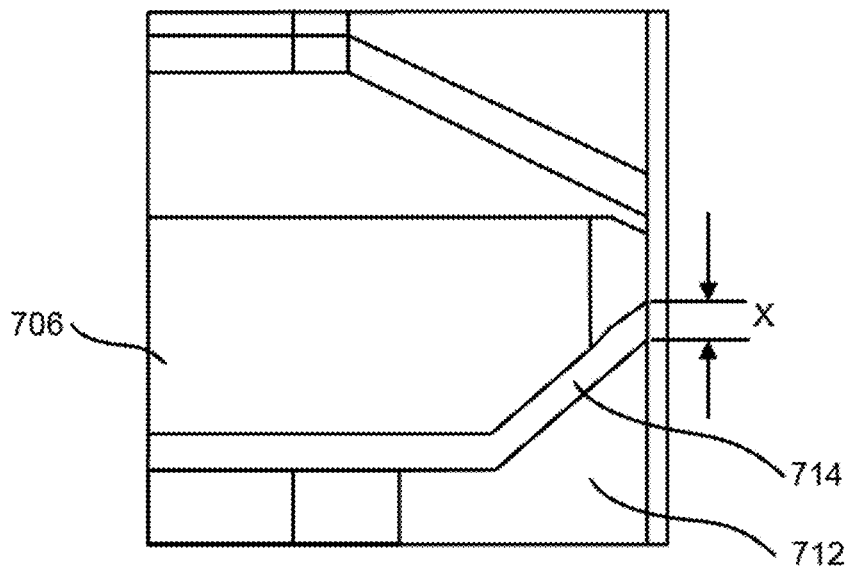
FIG. 8A is a computation model of a conventional magnetic recording system according to one embodiment.
Figure 8B:
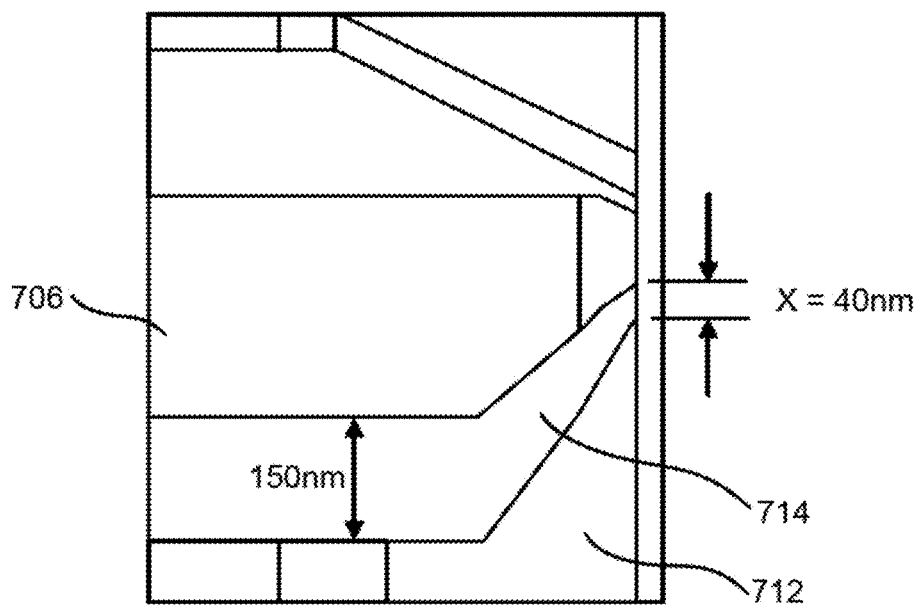
FIG. 8B is a computation model of a magnetic recording system according to one embodiment.

In order to concretely explain the working effect of same approaches described and/or suggested herein, a calculation was made. FIGS. 8A-8B illustrate a computation simulation model. FIG. 8A illustrates a comparative structure in which a leading gap 714 between a main magnetic pole 706 and a leading shield 712 is extended constantly in the depth direction from the media facing surface side. The intervals X of the leading gap 714 were changed into 40 nm/70 nm/150 nm in the structure of the comparative example. FIG. 8B illustrates the structure of a preferred illustrative embodiment. The simulation thereof was made based on a shape of a bump later depicted in FIG. 14C. Although there is a difference between the bump shapes of FIGS. 7B and 8B, it is assumed the structure of FIG. 7B can provide more advantageous work effect than that of FIG. 8B in characteristics thereof, because the film thickness of the main magnetic pole of FIG. 7B is larger than that of FIG. 8B.

As shown in FIG. 8B, the interval X of the main magnetic pole 706 and the leading gap 714 is set to 40 nm at first, gradually increased in the depth direction, and is finally set to 150 nm at a position recessed from the media facing surface.

Figure 9:
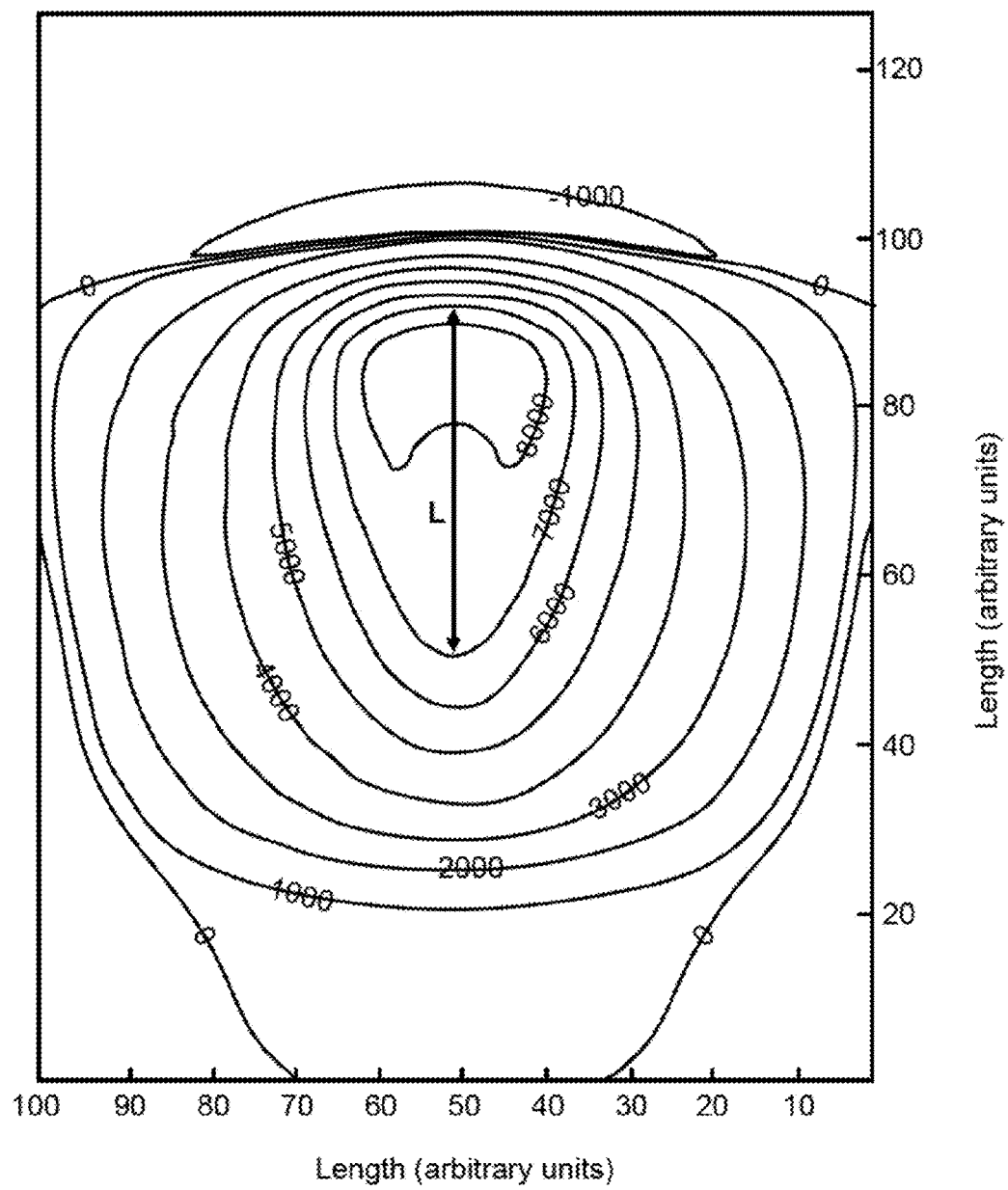
FIG. 9 is a contour map illustrating a magnetic field obtained from computation results according to one embodiment.

Referring now to FIG. 9, a contour map is depicted, showing a recording magnetic field from the main magnetic pole 706 based on a calculation. Although the illustrated pattern of the contour map is made based on the calculation, it is more effective to prevent removal of adjacent tracks when a recording bubble length L is set to be shorter.

Figure 10:
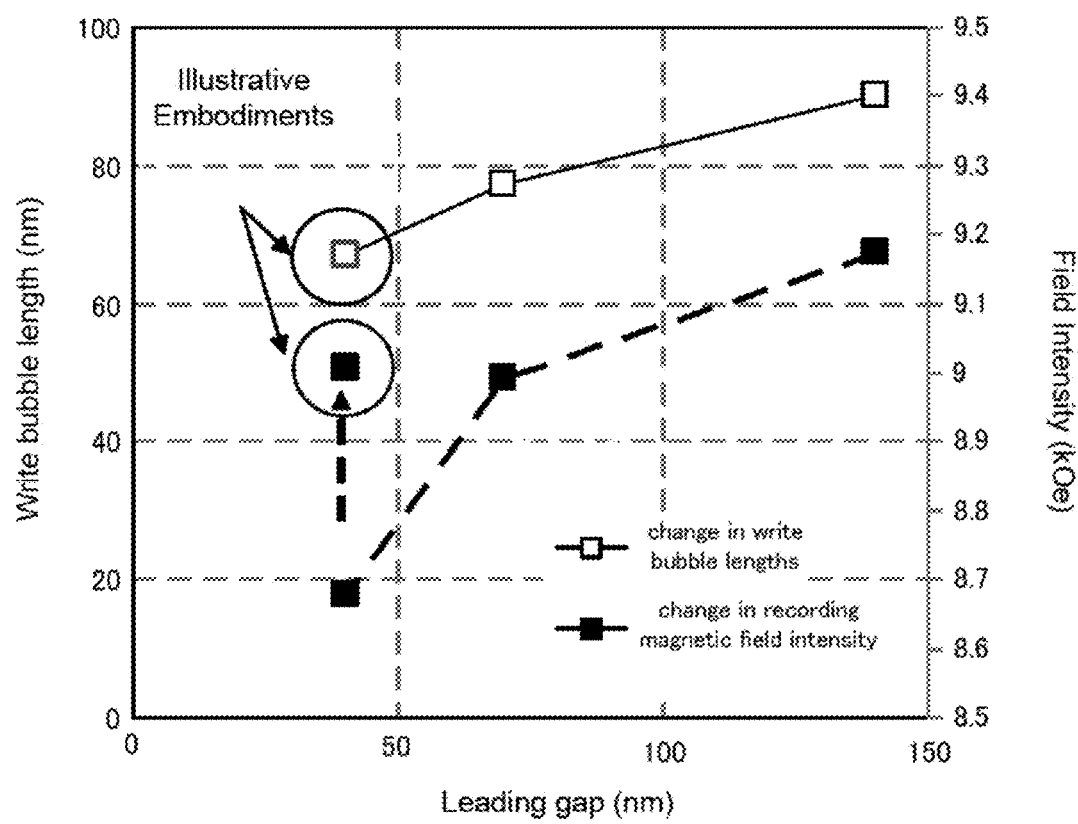
FIG. 10 depicts a graph according to one embodiment.

FIG. 10 illustrates a relationship between the recording (write) bubble length and the recording magnetic field intensity for various values of X of the leading gap 714 as shown above in FIGS. 8A-8B. The upper line illustrates changes of write bubble lengths according to the comparative example, and the lower line illustrates changes of recording magnetic field intensity according to the comparative example. In the related art structure, as the aforementioned interval X of the leading gap 714 is shortened, the length of the write bubble also decreases dramatically. However, the recording magnetic field intensity also tends to be decreased at the same time.

In contrast, according to the structure of a preferred illustrative example, a characteristic of a point surrounded by a circle of the broken line in FIG. 10 can be obtained, and the field intensity is improved by about 300 kOe rather than decreased even at 40 nm for the interval X of the leading gap 714. More specifically, it may be possible that the shortening of the write bubble length is compatible with retaining the elevating of the recording field intensity. This is the working effect of the presence of the nonmagnetic leading bump 716. As a result, various approaches may provide the compatibility of both the narrower leading gap 714 and the retaining of the recording (write) magnetic field which is unattainable in conventional heads.

FIGS. 11A-11K" depict a process flow for creating the structure 1100, in accordance with one embodiment. As an option, the present structure 1100 may be implemented in conjunction with features from any other embodiment listed herein, such as those described with reference to the other FIGS. Of course, however, such structure 1100 and others presented herein may be used in various applications and/or in permutations which may or may not be specifically described in the illustrative embodiments listed herein. Further, the structure 1100 presented herein may be used in any desired environment.

Referring now to FIGS. 11A-11K" a process flow is depicted for embodying the structure 1100 of a preferred illustrative embodiment. Moreover, the process is based on a damascene process in which after a trench of alumina is formed, the main magnetic pole may be filled in the formed trench by plating.

Figure 11A:
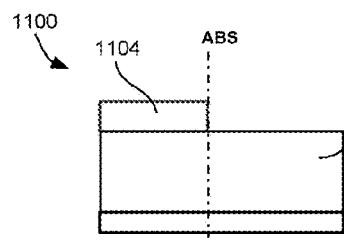
FIG. 11A is a partial cross-sectional view of a magnetic recording head according to one embodiment.

FIG. 11A is a sectional view taken along a height direction of an element in which a magnetic film 1102 is formed on a substrate for the leading shield. A pattern of a resist 1104 for machining the shield to be tapered is formed. In a preferred approach, the materials of the magnetic film may include a film of NiFe, FeCo, etc. According to various approaches, the aforementioned film may include a plating film, sputtering film, etc. The film thickness of the magnetic material may preferably be in a range of about 100 nm to about 400 nm, but may be thinner or thicker based on the desired embodiment. In a preferred approach, the film thickness may provide shielding functionality.

According to various approaches, the materials used for machining may include a resist, and preferably a DLC film having a milling resistance, other than the resist, etc.

Figure 11B:
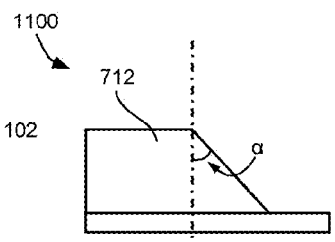
FIG. 11B is a partial cross-sectional view of a magnetic recording head according to one embodiment.

FIG. 11B is a sectional view taken along a height of an element which depicts the tapered shape formed by using a milling process and a resist 1104 as a mask. The taper angle α was set to 40°. In one approach a condition of the milling process may be set at an incidence angle of 40° with Sweep+/−50 deg. It is possible to obtain the leading shield 712 of a desired taper shape by using this milling process, because the taper shape is determined based on the incidence angle. Alternatively, it is possible to use a frame plating method in which a plating film is formed by forming a resist on the film of the plating sheet.

Figure 11C:
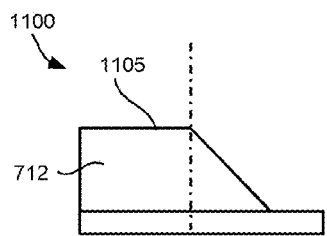
FIG. 11C is a partial cross-sectional view of a magnetic recording head according to one embodiment.

FIG. 11C is a sectional view taken along a height of an element in which the EPD (End Point Detector) film 1105 is formed. The film is preferable when forming the nonmagnetic leading bump in a back-end process, and used as EPD (End Point Detector) of milling. The film may include oxide materials such as SiO2, etc.

Figure 11D:
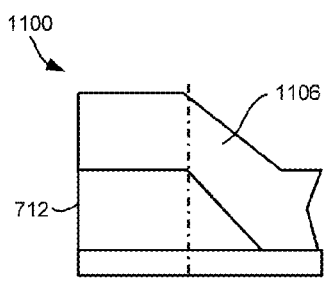
FIG. 11D is a partial cross-sectional view of a magnetic recording head according to one embodiment.

FIG. 11D is a sectional view taken along a height of an element in which nonmagnetic film 1106 is formed on the leading shield 712 by using a spatter film. Although NiCr was used as the material of the nonmagnetic film depicted in FIGS. 11A-11K", according to various approaches, Ru, Ta, SiO2, etc. may also be used. The tapered shape may be formed by using a milling process and a resist as a mask. The film thickness of the nonmagnetic film 1106 may be identical to that of the magnetic film 1102 for forming the leading shield, or preferably may be larger than that of the magnetic film.

Figure 11E:
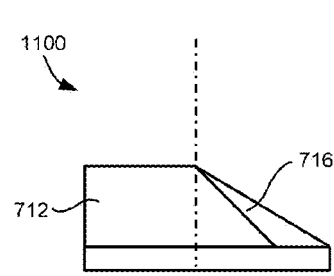
FIG. 11E is a partial cross-sectional view of a magnetic recording head according to one embodiment.
Figure 13:
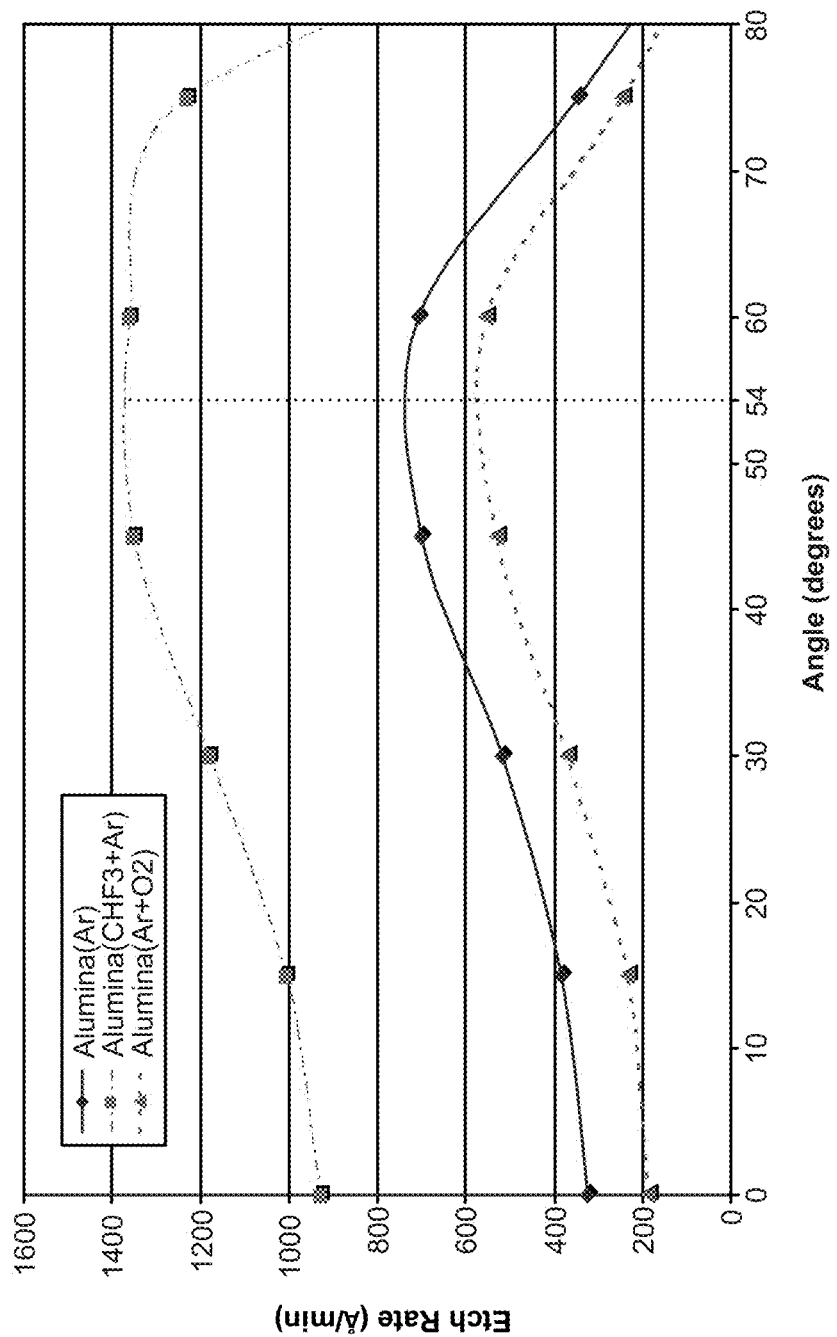
FIG. 13 depicts a graph according to one embodiment.

FIG. 11E is a sectional view taken along a height of an element in which a nonmagnetic leading bump 716 is formed on a side wall of the leading shield 712. NiCr of the nonmagnetic film 1106 shown in FIG. 11D is formed by using dependency of milling angles; and as shown in FIG. 13, milling is dependent upon the incidence angle.

Without wishing to be bound by any theory, it is believed that the milling rate is the highest at 54°. When the milling is performed by using the incidence angle 54°, the milling rate of an inclined part is lower than that of a flat part because there is an angle in the side wall of the leading shield 712. As a result, NiCr remains in the form of self-alignment in the side wall of the leading shield 712, as shown in the drawing.

The remaining NiCr becomes the nonmagnetic leading bump 716, which is one of the characteristics according to the various embodiments. Furthermore, it is possible to increase a precision degree of a stopper of milling by monitoring Ta which is the EPD detection film 1105 formed in FIG. 11C, and by performing the milling. As a result, it is possible to minimize the influence on the film thickness of the leading shield 712.

In addition to FIG. 11E, FIG. 11F is a sectional view taken along a height of an element in which RIE stopper 1108 and an alumina 1110 for forming the main magnetic pole are formed to machine the alumina 1110 by using RIE.

FIG. 11F" is a view as viewed from the media facing surface. The alumina is machined to be the shape of a "V" groove trench. Further, BCL 3 may be used for RIE gas as the desired shape of a "V" groove can be attained by using this gas and a predetermined etching condition.

FIG. 11G is a sectional view taken along a height of an element in which the leading gap 714 is formed, and then, a plating is applied to a center of the "V" groove trench, and the plated portion is flatted by CMP. Moreover, FIG. 11G" is a view as viewed from the media facing surface. The leading gap 714 is formed by using Atomic Layer Deposition (ALD) because a film is preferably formed evenly on the interior of the trench. According to various approaches, the leading gap may include Ru, alumina, etc.

An interval of the leading gap 714 between an upper end of the main pole 706 and the leading shield 712 is set to SGb. This leading gap 714 can also function as a side gap.

According to an illustrative example, the plate shield film may include CNF/NiCr. Furthermore, the plate film may include CoNiFe. The plate composition of CoNiFe plate may also include a base bath which has $CoSO_4$, $NiSO_4$, $FeSO_4$ as base and $H_3BO_3$, NaCl as additive, sodium saccharin as stress agent. It is preferable that the saturated magnetic flux density Bs of the plate film is higher in an area determining the track width than an area of a reversed trapezoid shape. This is because there is a characteristic that if Bs of the area determining the track width is larger, an inclination of magnetic field thereof becomes larger.

In the case of using the same plate bath as plating condition, the current density used in the plating process is increased higher than that in the reversed trapezoid shape to increase a containing amount of Fe and improve Bs. Further, it is preferable that the current density is changed from about 10 $Ma/cm^2$ to about 25 $Ma/cm^2$, but may be higher or lower based on the desired embodiment. It is, however, preferable to adjust the current density according to various changes of liquid compositions. Furthermore, in the case of forming under the same current density, a technique may be used in which two kinds of plate baths having higher densities of Fe are prepared in advance to perform the plating process.

FIG. 11H is a sectional view taken along a height of an element in which the alumina is removed by using NaOH and performing WET, and ME stopper 1108 is removed by milling. Furthermore, FIG. 11H" is a view as viewed from the media facing surface.

FIG. 11I is a sectional view taken along a height of an element in which a nonmagnetic film for forming a side gap 704 is formed. And FIG. 11I" is a view as viewed from the media facing surface.

FIG. 11J is a sectional view taken along a height of an element in which the alumina for the side gap 704 is etched back with RIE, the alumina other than the main magnetic pole is removed. FIG. 11J" is a view as viewed from the media facing surface. The alumina can be selectively formed on the side wall of the main magnetic pole, when RIE is applied. The side gap 704 can be formed by dividing the side gap 704 and the leading gap 714 through this process. As a result, a structure of SGb<SGa can be attained.

FIG. 11K is a sectional view taken along a height of an element in which a taper angle of 20° to 30° is formed on the main magnetic pole 706 so as to improve the magnetic field, and a trailing gap 710, a trailing shield 708 and a side shield 702 are formed.

FIG. 11K" is a view as viewed from the media facing surface. It is possible to complete a main portion of the main magnetic pole 706 in this process by completing this shield.

Figure 12A:
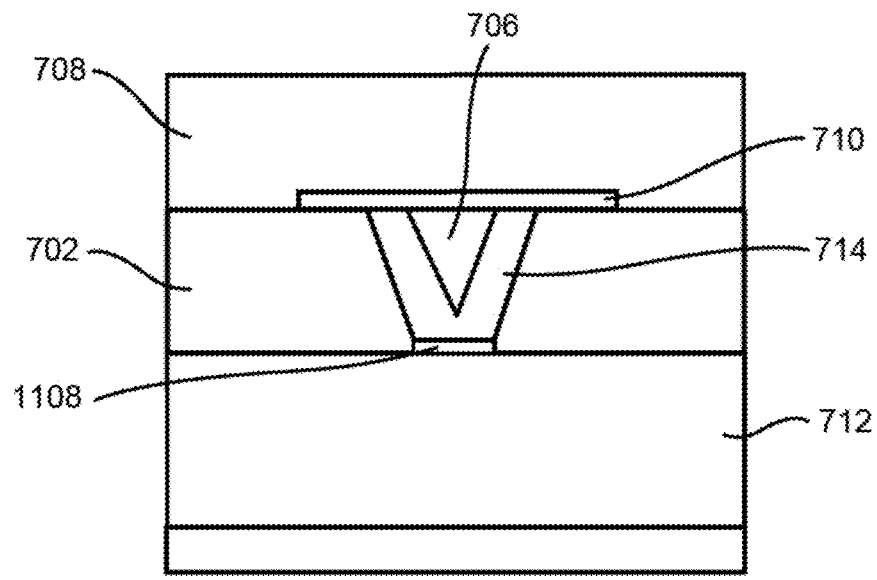
FIGS. 12A-12B are partial views of a magnetic recording head according to one embodiment.
Figure 12B:
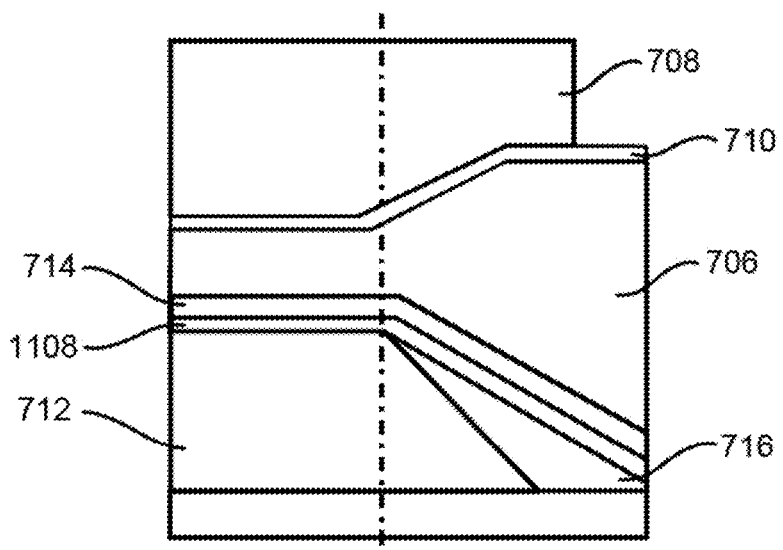

FIGS. 12A-12B are views in which only a leading gap 714 is formed to be compatible in use with a side gap, without a side gap formed by dividing. FIG. 12A is a view as viewed from the media facing surface, and FIG. 12B is a sectional view taken along a height of the element. In one approach, only the leading gap 714 may be formed.

Figure 14A:
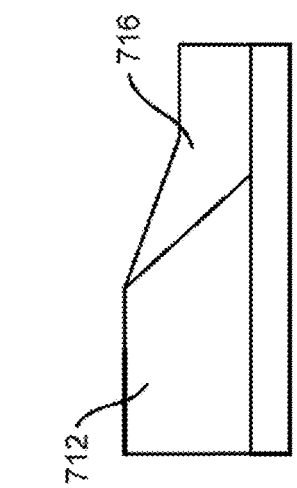
FIG. 14A is a partial cross-sectional view of a magnetic recording head according to one embodiment.
Figure 14B:
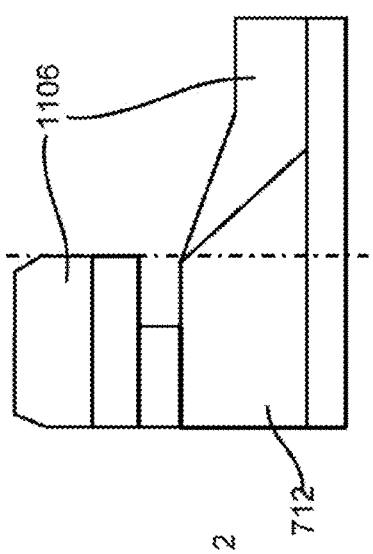
FIG. 14B is a partial cross-sectional view of a magnetic recording head according to one embodiment.
Figure 14C:
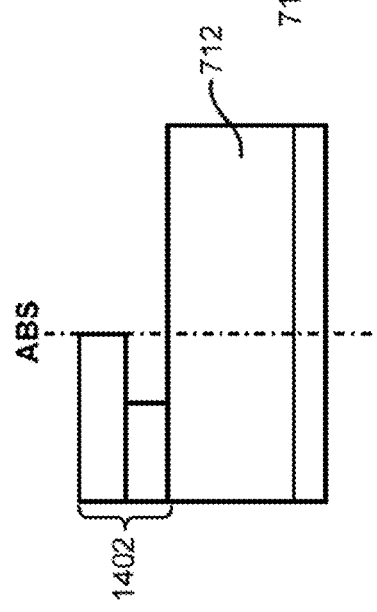
FIG. 14C is a partial cross-sectional view of a magnetic recording head according to one embodiment.

FIGS. 14A-C illustrate a method for forming a preferred illustrative embodiment of a nonmagnetic leading bump. FIG. 14A is a view taken along a height of an element in which a two-layer resist 1402 is formed on the leading shield 712. Such a lift-off structure can be formed.

FIG. 14B is a view taken along a height of an element in which the two-layer resist 1402 is formed on the leading shield 712 and after the two-layer resist 1402 is formed and machined by milling to be tapered in shape, a NiCr film of nonmagnetic film 1106 is formed.

FIG. 14C is a view taken along a height of an element in which the resist is removed. Even in such a process, it is possible to form the nonmagnetic leading bump 716 in the side wall of the leading shield 712. In the nonmagnetic leading bump 716 of this example, the film thickness is increased gradually from the media facing surface, and becomes constant near the rearward end of the taper part of the leading shield 712. Even in such a bump structure, as shown in FIGS. 8B and 10, it is possible that the length of the magnetic field is formed to be shorter while the recording magnetic field intensity is retained to be higher.

Figure 15:
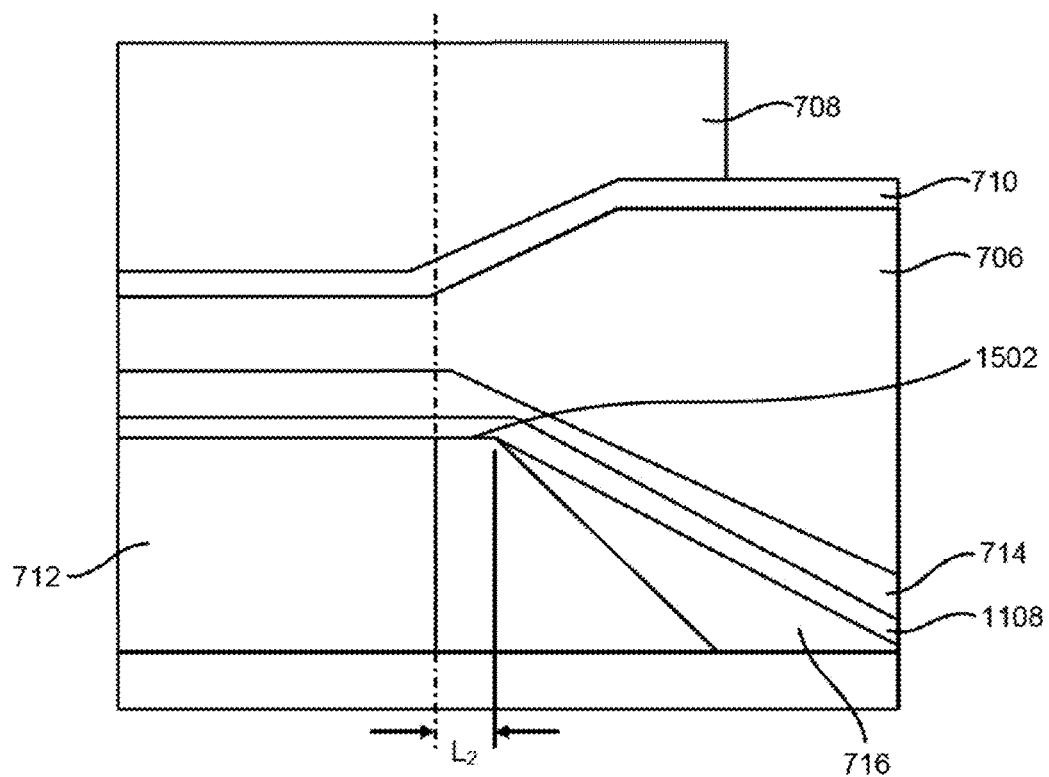
FIG. 15 is a partial cross-sectional view of a magnetic recording head according to one embodiment.

FIG. 15 is a sectional view taken along a height of an element in which the shape of the leading shield 712 is modified. It is possible that a flat part 1502 (a length $L_2$ of the flat part) is supported on the leading end thereof in the leading shield 712 as shown in the drawing, so as to saturate the shield. In this case, the nonmagnetic leading bump 716 is formed at a deeper position recessed by an interval length $L_2$ from the media facing surface.

The present can provide a magnetic recording head in which magnetic field intensity and magnetic field inclination with high density of surface area recording can be retained by mounting of the perpendicular recording magnetic head, and the removal of adjacent tracks can be prevented so that recording ability of the head as well as product yield of the head can be improved.

According to one illustrative embodiment, a magnetic data storage system may include at least one perpendicular magnetic recording head according to any approach discussed or suggested herein. Furthermore, the magnetic data storage system may include a magnetic medium.

Moreover, the magnetic data storage system may additionally include a drive mechanism for passing the magnetic medium over the at least one magnetic head. Also a controller may be electrically coupled to the at least one magnetic head of the magnetic data storage system for controlling operation of the at least one magnetic head.

It should be noted that methodology and systems presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording head, comprising:
   a main magnetic pole;
   a leading shield below a leading side of the main magnetic pole;
   a leading gap between the leading shield and the main magnetic pole;
   a trailing shield above a trailing side of the main magnetic pole;
   a trailing gap between the trailing shield and the main magnetic pole; and
   a nonmagnetic leading bump between the main magnetic pole and the leading shield,
   wherein the leading bump is a separate layer from the leading gap,
   wherein the leading bump extends to a media facing surface,
   wherein the leading bump has a first portion, a thickness of the first portion increasing therealong in a direction away from the media facing surface.

2. The perpendicular magnetic recording head according to claim 1, wherein the leading bump extends along the leading side of the main magnetic pole between the main magnetic pole and the leading gap.

3. The perpendicular magnetic recording head according to claim 1, wherein the leading bump has a second portion extending from the first portion in a direction away from the media facing surface, a thickness of the second portion decreasing therealong in a direction away from the media facing surface.

4. The perpendicular magnetic recording head according to claim 3, wherein portions of the leading and trailing sides of the main magnetic pole taper towards one another therealong in a direction towards the media facing surface.

5. The perpendicular magnetic recording head according to claim 4, wherein the leading bump extends along the tapered portion of the leading side of the main magnetic pole between the main magnetic pole and the leading gap.

6. The perpendicular magnetic recording head according to claim 1, wherein the leading bump has a triangular cross sectional shape along a plane dissecting the main magnetic pole in an in-track direction.

7. The perpendicular magnetic recording head according to claim 1, further comprising a side shield on a cross track side of the main magnetic pole and a nonmagnetic side gap defined between the main magnetic pole and the side shield, wherein the leading gap is narrower than the side gap at the media facing surface.

8. The perpendicular magnetic recording head according to claim 1, wherein the leading gap at a media facing surface thereof comprises a material selected from a group consisting of an oxide, and a nonmagnetic material.

9. The perpendicular magnetic recording head according to claim 1, wherein portions of the leading and trailing sides of the main magnetic pole taper towards one another therealong in a direction towards the media facing surface.

10. The perpendicular magnetic recording head according to claim 9, wherein the leading bump extends along the tapered portion of the leading side of the main magnetic pole.

11. A magnetic data storage system, comprising:
    at least one perpendicular magnetic recording head as recited in claim 1;
    a magnetic medium;
    a drive mechanism for passing the magnetic medium over the at least one magnetic head; and
    a controller electrically coupled to the at least one magnetic head for controlling operation of the at least one magnetic head.

12. A perpendicular magnetic recording head, comprising:
    a main magnetic pole;
    a leading shield below a leading side of the main magnetic pole;
    a nonmagnetic leading gap between the leading shield and the main magnetic pole;
    a trailing shield above a trailing side of the main magnetic pole;
    a nonmagnetic trailing gap between the trailing shield and the main magnetic pole; and
    a nonmagnetic leading bump between the main magnetic pole and the leading shield,
    wherein a portion of the leading side of the main magnetic pole tapers towards the trailing side of the main magnetic pole therealong towards a media facing surface thereof;
    wherein the leading bump has a first portion extending along the portion of the leading side, a thickness of the first portion increasing therealong in a direction away from the media facing surface;
    wherein the leading bump has a triangular cross sectional shape along a plane dissecting the main magnetic pole in an in-track direction.

13. The perpendicular magnetic recording head according to claim 12, wherein the leading gap at the media facing surface thereof comprises a material selected from a group consisting of an oxide, and a nonmagnetic material.

14. The perpendicular magnetic recording head according to claim 12, wherein the leading bump has a second portion extending from the first portion in a direction away from the media facing surface and along the tapered portion of the main magnetic pole, a thickness of the second portion decreasing therealong in a direction away from the media facing surface.

15. The perpendicular magnetic recording head according to claim 14, wherein a portion of the trailing side of the main magnetic pole tapers towards the leading side therealong in a direction towards the media facing surface.

16. The perpendicular magnetic recording head according to claim 12, further comprising a side shield on a cross track side of the main magnetic pole and a nonmagnetic side gap defined between the main magnetic pole and the side shield, wherein the leading gap is narrower than the side gap at the media facing surface.

17. The perpendicular magnetic recording head according to claim 12, wherein the leading bump is recessed from the media facing surface.

18. A magnetic data storage system, comprising:
at least one perpendicular magnetic recording head as recited in claim 12;
a magnetic medium;
a drive mechanism for passing the magnetic medium over the at least one magnetic head; and
a controller electrically coupled to the at least one magnetic head for controlling operation of the at least one magnetic head.

19. A perpendicular magnetic recording head, comprising:
a main magnetic pole;
a leading shield below a leading side of the main magnetic pole;
a nonmagnetic leading gap between the leading shield and the main magnetic pole;
a trailing shield above a trailing side of the main magnetic pole;
a nonmagnetic trailing gap between the trailing shield and the main magnetic pole; and
a nonmagnetic leading bump between the main magnetic pole and the leading shield,
wherein portions of the leading and trailing sides of the main magnetic pole taper towards one another therealong in a direction towards a media facing surface,
wherein the leading bump extends along the tapered portion of the leading side of the main magnetic pole,
wherein the leading bump has a first portion, a thickness of the first portion increasing therealong in a direction away from the media facing surface,
wherein the leading bump has a second portion extending from the first portion in a direction away from the media facing surface, a thickness of the second portion decreasing therealong in a direction away from the media facing surface,
wherein the leading bump has a triangular cross sectional shape along a plane dissecting the main magnetic pole in an in-track direction.

20. The perpendicular magnetic recording head according to claim 19, wherein the leading bump is recessed from the media-facing surface.

21. A magnetic data storage system, comprising:
at least one perpendicular magnetic recording head as recited in claim 19;
a magnetic medium;
a drive mechanism for passing the magnetic medium over the at least one magnetic head; and
a controller electrically coupled to the at least one magnetic head for controlling operation of the at least one magnetic head.

* * * * *

UNITED STATES PATENT AND TRADEMARK OFFICE
CERTIFICATE OF CORRECTION

PATENT NO. : 8,941,948 B2
APPLICATION NO. : 13/526418
DATED : January 27, 2015
INVENTOR(S) : Kimitoshi Etoh et al.

Page 1 of 1

It is certified that error appears in the above-identified patent and that said Letters Patent is hereby corrected as shown below:

In the specification:

col. 5, line 6 replace "nomnagnetic" with --nonmagnetic--;

col. 5, line 7-8 replace "nomnagnetic" with --nonmagnetic--;

col. 9, line 45 replace "record ng" with --recording--;

col. 10, line 47 replace "nomnagnetic" with --nonmagnetic--;

col. 10, line 52 replace "nomnagnetic" with --nonmagnetic--;

col. 12, line 58 replace "nomnagnetic" with --nonmagnetic--;

col. 12, line 64 replace "nomnagnetic" with --nonmagnetic--;

col. 14, line 1 replace "ME" with --RIE--.

Signed and Sealed this
Thirtieth Day of June, 2015

Michelle K. Lee
*Director of the United States Patent and Trademark Office*